United States Patent
Murillo

[19]

[11] Patent Number: 5,899,814
[45] Date of Patent: May 4, 1999

[54] VEHICLE DRIVE TRAIN INCORPORATING A PLUNGING CONSTANT VELOCITY JOINT

[75] Inventor: Santiago Murillo, Holland, Ohio

[73] Assignee: Dana Corporation, Toledo, Ohio

[21] Appl. No.: 08/932,433

[22] Filed: Sep. 17, 1997

[51] Int. Cl.[6] .................................................. F16D 3/224
[52] U.S. Cl. ........................ 464/140; 464/145; 464/905
[58] Field of Search .................................. 464/143, 144, 464/145, 140, 162, 906

[56] References Cited

U.S. PATENT DOCUMENTS

| | | | |
|---|---|---|---|
| 2,933,354 | 4/1960 | Primeau . | |
| 3,053,584 | 9/1962 | Dunn . | |
| 3,069,874 | 12/1962 | Leto ........................................ | 464/140 |
| 3,425,239 | 2/1969 | Baier . | |
| 3,869,878 | 3/1975 | Davies et al. ........................... | 464/140 |
| 4,608,028 | 8/1986 | Welschof et al. ...................... | 464/145 |
| 4,767,381 | 8/1988 | Brown et al. ........................... | 464/906 |
| 5,052,979 | 10/1991 | Welschof et al. ...................... | 464/140 |
| 5,145,025 | 9/1992 | Damian . | |
| 5,334,096 | 8/1994 | Iwao . | |
| 5,356,341 | 10/1994 | Uchman et al. ........................ | 464/906 |
| 5,358,066 | 10/1994 | Shope . | |
| 5,611,733 | 3/1997 | Jacob et al. ............................. | 464/182 |

*Primary Examiner*—Eileen Dunn Lillis
*Attorney, Agent, or Firm*—MacMillan, Sobanski & Todd, LLC

[57] ABSTRACT

A automotive vehicle drive train is provided including a first rotative member, a first plunging constant velocity joint with a front end connected with the first rotative member, the first plunging constant velocity joint having a rear end torsionally connected with the front end, a drive shaft with a front end and a rear end, the drive shaft front end being connected with the rear end of the first plunging constant velocity joint, a second plunging constant velocity joint with a front end and a rear end, the front end of the second plunging constant velocity joint being connected with the rear end of the drive shaft, the rear end of the second constant velocity joint being connected with a second drive member, a spring connected with the second plunging constant velocity joint biasing the front and rear ends of the second plunging constant velocity joint to a predetermine relative axial position with respect to one another, and a damper connected with the second plunging constant velocity joint to dampen any axial movement of the front and rear ends of the second constant velocity joint with respect to one another.

20 Claims, 3 Drawing Sheets

VEHICLE DRIVE TRAIN INCORPORATING A PLUNGING CONSTANT VELOCITY JOINT

BACKGROUND OF THE INVENTION

This invention relates to vehicle drive train systems which incorporate plunging type constant velocity universal joints. Additionally this invention relates to an improved structure for a plunging constant velocity universal joint.

Universal joints are commonly used in the drive train systems of automotive vehicles. A universal joint is a mechanical coupling device which provides a rotational driving connection between two rotatable shafts, while permitting such shafts to be oriented at an angle relative to one another. For example, a universal joint is commonly used to provide a rotational driving connection between a rear end of a drive shaft (sometimes referred to as a propeller shaft) rotatably driven by a vehicle engine (via a transmission) and an input shaft connected to the vehicle rear axle is assembly (sometimes referred to as a differential input shaft). This is because the drive shaft and the rear axle assembly input shaft are rarely coaxially aligned. To accommodate this non-alignment, while still providing a rotational driving connection, a universal joint is provided therebetween.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the angle of rotation. In a non-constant velocity type or Cardan universal joint, the instantaneous angular velocities of the two shafts vary with the angle of rotation (although the average angular velocities for a complete rotation are equal).

A typical structure for a constant velocity universal joint includes a cylindrical inner race connected to one of the shafts and a hollow cylindrical outer race connected to the other of the shafts. The inner race fits concentrically within the outer race. The inner and outer races are mounted for angular articulation with respect to each other. The outer surface of the inner race and the inner surface of the outer race have respective pluralities of grooves formed therein. The grooves extend linearly and have generally semi-circular or other curvilinear cross sectional shapes. Each groove formed in the outer surface of the inner race is associated with a corresponding groove formed in the inner surface of the outer race. A ball is disposed in each of the associate pairs of grooves. The balls provide a driving connection between the inner and outer races, i.e., the ball provide a positive driving torque connection so that rotation of one of the inner or outer races results in rotation of the other of the inner and outer races. An annular cage is typically provided between the inner and outer races for retaining the balls in the grooves. The cage is provided with a plurality of circumferentially spaced openings for this purpose.

In one known variety of the ball and cage type of constant velocity universal joint, the grooves formed in the outer surface of the inner race are oriented so as to be alternately inclined relative to the rotational axis of the joint, i.e., the grooves on the surface of the inner race are not parallel to the axis of the inner race . Similarly, the grooves formed in the inner surface of the outer race are alternately inclined relative to the rotational axis of the outer race. For each pair of associated inner and outer race grooves, the inner race groove is inclined in one direction relative to the rotational axes of the joint, while the outer race groove is inclined in the opposite direction. Joints having this orientation of the two different sets of grooves is commonly referred to as a cross groove constant velocity joint.

Known cross groove joints permit relative axial movement between the inner race and the cage, as well as between the cage and the outer race. Thus, the center of the joint (which is defined by the point of intersection of the rotational axis of the two shafts connected thereto) can move axially during use. A design of a universal joint structure that allows relative axial movement between the inner and outer race is useful because distance variations between the transmission and the axle assembly occurring during the normal flexing of the vehicle frame can be reconciled. Further, distance variations resulting from vehicle jounce and rebound can also be reconciled. Universal joints such as cross groove joints that allow axial movement of the two shafts are commonly referred to as plunging constant velocity universal joints. Because there is no physical engagement between the inner race and the cage or between the cage and the outer race, cross groove joints have been found to be well suited for high rotational speed applications.

In many rear wheel drive vehicle applications the drive shaft is not only non-aligned with the input shaft of the rear axle assembly but is also non-aligned with an output shaft of the transmission. Therefore two universal joints will be utilized. A front or forward universal joint will join the transmission output shaft to a front end of the drive shaft. A second or rearward universal joint will join the input shaft of the rear axle assembly to a rear end of the drive shaft.

The vehicle engine and transmission are rigidly fixed to a flame of the vehicle. However the rear axle assembly is connected to the frame via a suspension system. Therefore the rear axle assembly's position with respect to the vehicle frame, engine and transmission is not fixed and can often change with movement or dynamic loading of the vehicle. To accommodate the change of position of the rear axle assembly with respect to the transmission it is preferable that plunging constant velocity joints be utilized to connect the drive shaft with the transmission output shaft and the rear axle assembly input shaft. The aforementioned arrangement allows the drive shaft to translate along its axis within limits imposed by the two plunging constant velocity universal joints.

In vehicle drive trains wherein the drive shaft is connected to two plunging constant velocity universal joints, rapid accelerations can cause the drive shaft to violently plunge to the limit of travel of one of the constant velocity universal joints. The violent travel of the drive shaft generates an undesirable noise condition and adds wear to seals of the joint.

An attempt to rectify the above noted problem has been made by adding a spring to one of the joints. The spring was used to limit the travel of the drive shaft. However the added spring did not solve the problem because the amount of resistance to rapid movement is limited to the spring constant. The added spring provides resistance inhibiting drive shaft travel, but does not prevent violent movement of the drive shaft.

SUMMARY OF THE INVENTION

The present invention provides a vehicle drive train that utilizes a drive shaft with plunging constant velocity universal joints at both ends. At least one of the constant velocity universal joints has a damper to limit travel of the drive shaft during rapid acceleration of the vehicle. The damper limits the velocity and acceleration of movement of the drive shaft, thereby greatly diminishing or eliminating violent movement of the drive shaft. Therefore rapid vehicle accelerations do not generate undesirable noise, nor do they result in excessive wear on the universal joint seals. In addition, at least one of the constant velocity universal joints has a spring. The spring can be provided with the constant velocity universal joint having the damper, or can be associated with the other constant velocity universal joint at the other end of the drive shaft.

According to this invention, there is provided a drive train including a first rotative drive member, a first plunging constant velocity joint with a front end connected with the first rotative member, the first plunging constant velocity joint having a rear end torsionally connected with the front end, a drive shaft with a front end and a rear end, the drive shaft front end being connected with the rear end of the first plunging constant velocity joint, and a second plunging constant velocity joint with a front end connected with the rear end of the drive shaft, and with a rear end connected with a second drive member, whereby at least one of the first and the second plunging constant velocity joints is provided with a spring connected with the plunging constant velocity joint biasing the front and rear ends of the plunging constant velocity joint to a predetermined axial position relative to one another; and at least one of the first and the second plunging constant velocity joints is provided with a damper connected with the plunging constant velocity joint to dampen axial movement of the front and rear ends of the constant velocity joint with respect to one another. The spring and the damper can both be associated with the same constant velocity universal joint.

According to this invention, there is also provided a plunging constant velocity joint for connecting a first rotative member having a first rotative axis to a second rotative member having a second rotative axis, where the joint includes a front end for connection with the first rotative member, a rear end connected with the second rotative member, the rear end being torsionally connected with the front end, a spring biasing the front and rear ends to a predetermined relative axial position with respect to one another, and a damper connected with the plunging constant velocity joint to dampen axial movement of the front and rear ends of the joint with respect to one another.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
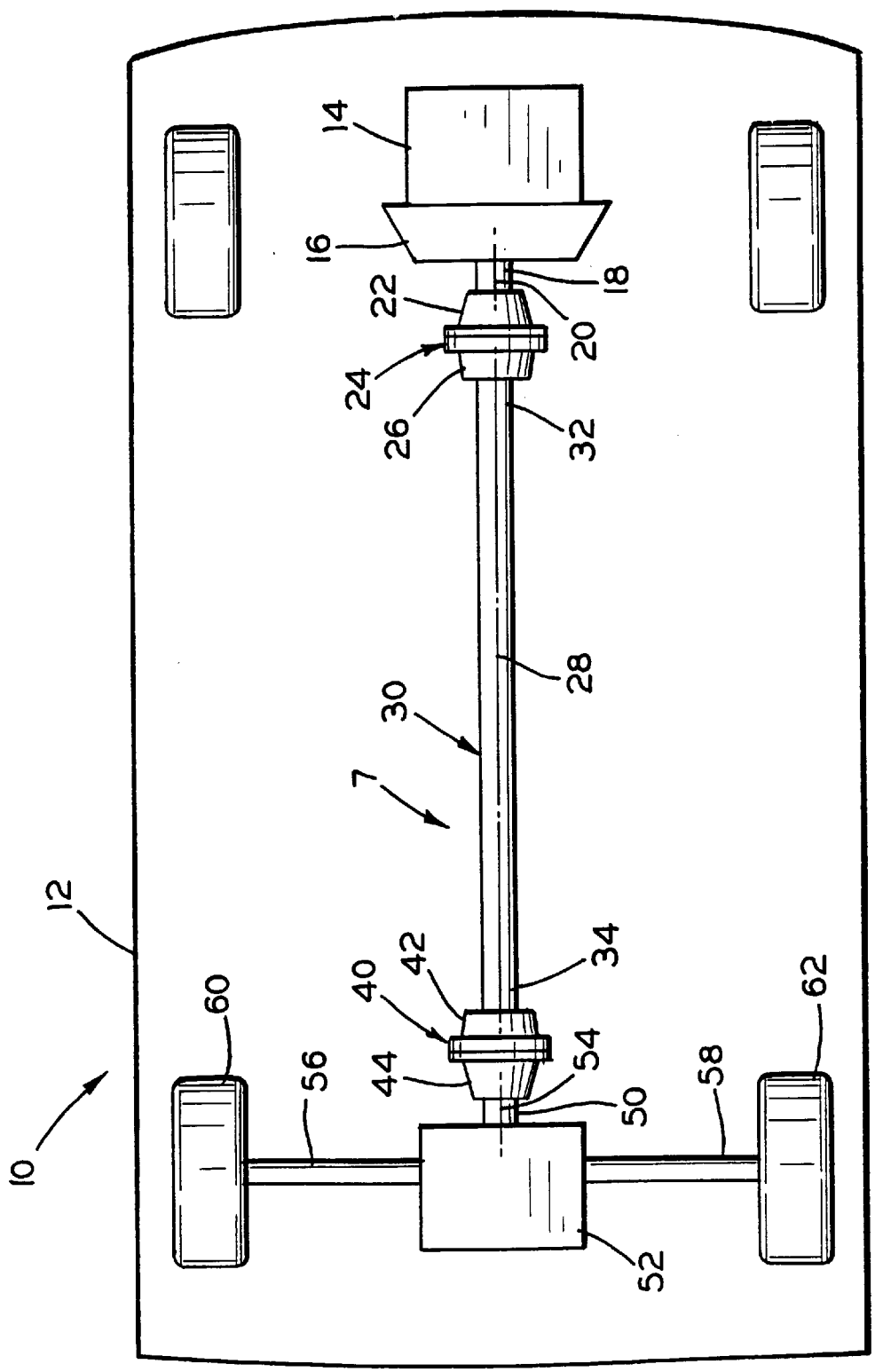
FIG. 1 is a schematic top plan view of a vehicle with a preferred embodiment drive shaft according to the present invention.
Figure 2:
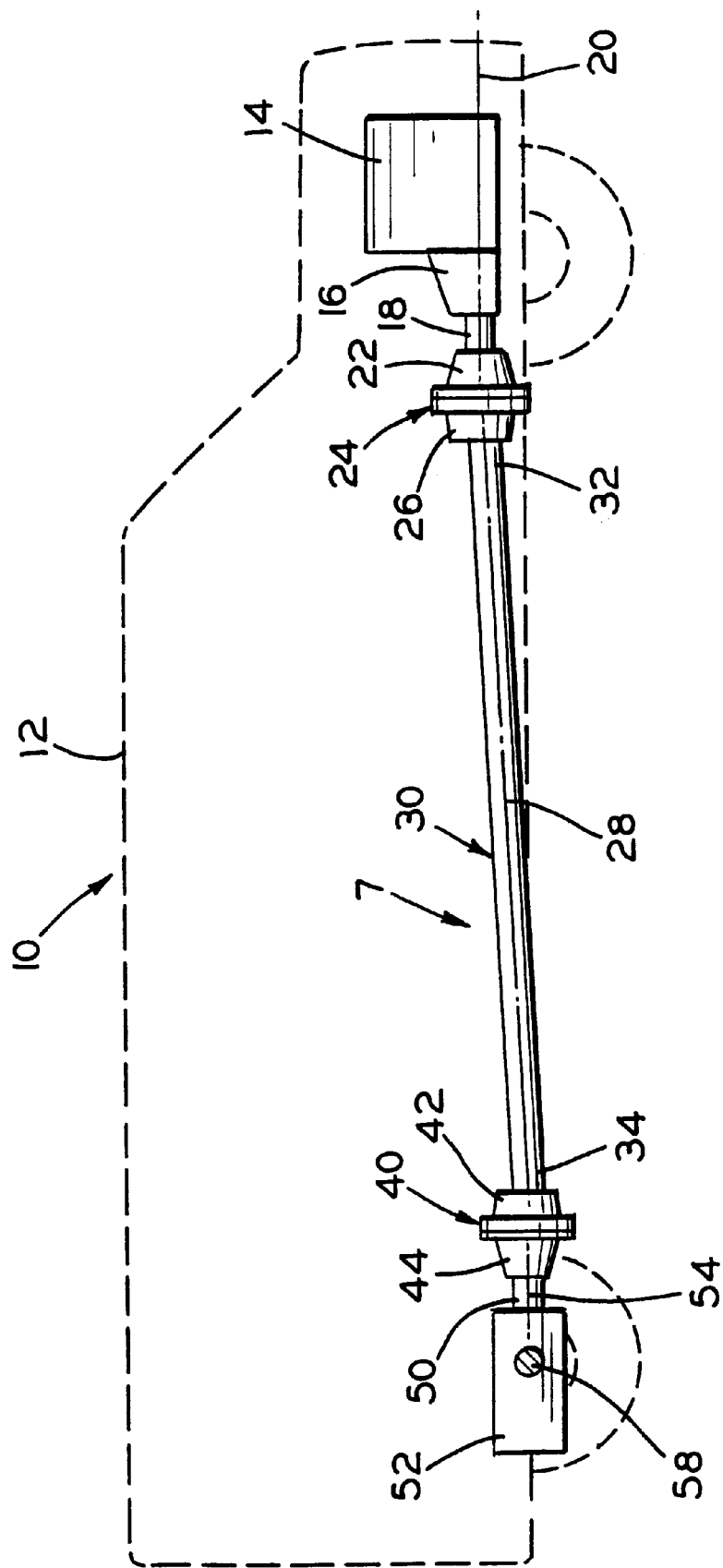
FIG. 2 is a schematic side elevational view of the vehicle and drive shaft shown in FIG. 1.
Figure 3:
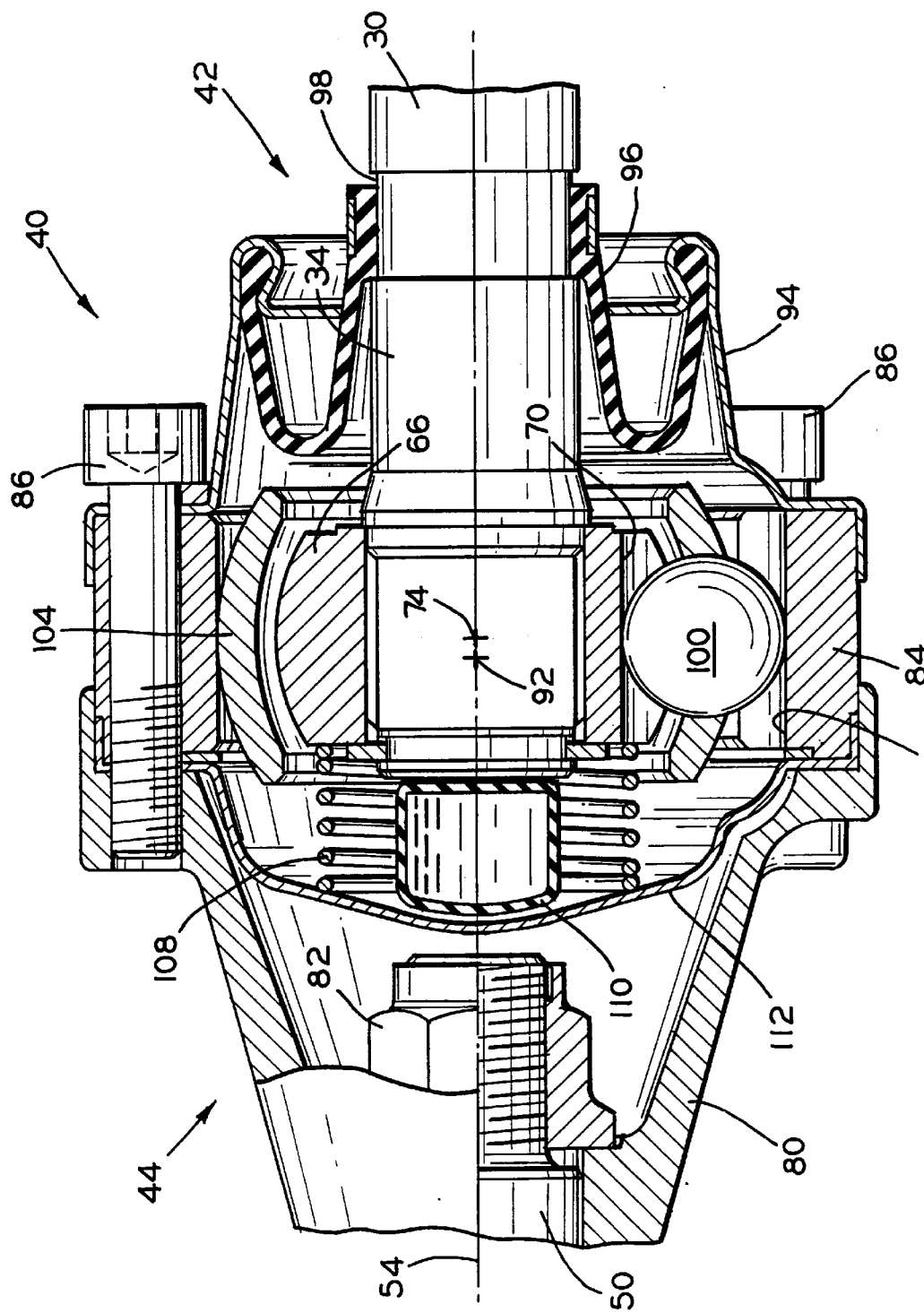
FIG. 3 is an enlarged top plan view, partially in cross section, of a cross groove plunging type constant velocity universal joint utilized in the device shown in FIG. 1.

Referring now to FIGS. 1–3, a vehicle 10 has a frame or body 12 powered by the present inventive drive train 7. The drive train 7 includes an engine 14 powering a transmission 16. The engine 14 and transmission 16 are rigidly connected to the vehicle frame/body 12. At the rear end of the transmission 16 is an output shaft 18. The transmission output shaft 18 rotates about a rotative axis 20 (FIG. 2). The transmission output shaft 18 is connected with a front end 22 of a front plunging constant velocity universal joint 24. The front end 22 of the joint 24 rotates along the rotative axis 20 of the transmission output shaft 18. The front end 22 is torsionally connected with a rear end 26 of the joint 24. The joint rear end 26 rotates along a rotational axis 28 that is angled with respect to the rotational axis 20.

Extending parallel with the rotational axis 28 is a drive shaft 30. The drive shaft 30 has a front end 32 connected with the rear end 26 of the front constant velocity universal joint 24. The drive shaft has a rear end 34. The rear end 34 of the drive shaft is connected with a rear or second plunging constant velocity universal joint 40.

The second constant velocity universal joint 40 has a front end 42 and a rear end 44 that are torsionally connected to one another. The joint front end 42 is connected with the rear end 34 of the drive shaft and rotates with the drive shaft 30 along the axis 28.

A differential input shaft 50 of a rear axle assembly differential 52 is connected with the joint rear end 44. The input shaft 50 and joint rear end 44 rotate about an axis 54. Axis 54 is typically angled with respect to the axis 28 (in a vertical plane). The differential 52 has two output shafts 56 and 58 which power rear wheels 60 and 62.

As shown in FIG. 3, the front end 42 of the second joint 40 has a hub or inner race 66 that is fixably connected to the rear end 34 of the drive shaft. As shown, the inner race encircles the drive shaft, although other connections between the drive shaft and the inner race are possible. The inner race 66 has a series of geometrically spaced linear grooves 70 along an outer surface. The grooves 70 have a semi-circular cross sectional or other curvilinear shape and have longitudinal axes, not shown. A common feature of the grooves of cross groove constant velocity universal joints is that the grooves are alternately inclined with respect to the axis 28. Therefore, each alternate groove is oriented at a different angle from the previous groove. The inner race 66 has a rotational center 74, which is the point about which the inner race rotates.

The second joint rear end 44 has a diverging flange 80 joined to the differential input shaft 50 by a nut 82. A ring shaped cap or outer race 84 is coaxially fixed to the flange 80 by a series of bolts 86. The outer race 84 carries a converging seal flange 94 that mounts a flexible seal 96 that encircles the drive shaft second end 34 along an annular groove 98. The flange 80, outer race 84 and flange 94 provide a housing for the joint 40. The outer race 84 has a series of geometrically spaced linear grooves 88 which correspond to the grooves 70 in the inner race. The alternately inclined grooves 88 have a semi-circular cross sectional shape with longitudinal axes at different angles so that the grooves 88 are alternately, or cross inclined, with respect to the grooves 70.

The outer race 84 has a rotational center 92 which intersects the rotational axis 54. As shown in FIG. 3, looking downward along a center line of the vehicle 10, the rotational axes 28 and 54 are generally aligned in the same vertical plane. As shown in FIG. 2, which is oriented 90 degrees from FIG. 3, the rotational axes 28 and 54 are at an angle to each other.

A ball 100 is disposed in each pair of the paired grooves 70, 88. The balls 100 provide a driving connection between the inner race 66 and the outer race 84. An angular cage 104 with a series of geometrically spaced apertures, is provided to retain the balls 100 in the grooves 70, 88. In a cross groove joint like the joint 40, axial movement can occur between the outer race 84 and the cage 104. Axial movement can also occur between the cage 104 and the inner race 66, resulting in relative movement between the inner race and the outer race. Because there is no direct engagement between the outer race 84 and the cage 104, or between the inner race 66 and the cage 104, joint 40 is suited for a high rotational speed application. The extent of allowable movement of the inner race with respect to the outer race is established by the degree of movement or "play" associated with the openings in the cage 104 and the degree to which the cage can move relative to the inner and outer races.

In operation of the joint 40, rotational centers 92, and 74 can move axially relative to one another to accommodate the dynamic loading of the vehicle 10. During periods of acceleration the drive shaft 30 tends to move rearward (i.e., toward the left as illustrated in FIGS. 1–3 toward the differential 52. The cage and inner and outer race configurations limit the movement of the inner race, and allow the inner race to move only to the prescribed physical boundaries of the configuration. If movement of the drive shaft 30, and hence inner race, is too violent or sudden, as explained above, audible noise and/or physical lurching of the apparatus can occur.

To retard violent, too rapid relative movement of the inner and outer races, the constant velocity joint 40 has an internally connected spring 108. The spring 108 biases the rotational centers 92 and 74 to predetermined relative axial positions with respect to one another, i.e., biases the two centers away from each other as shown in FIG. 3, and stores energy upon rearward movement of the drive shaft 30. The spring resists the movement of the inner race relative to the outer race by a force, as determined by the spring constant of the spring. The force of resistance is a function of the amount of compression of the spring.

To further inhibit violent, rapid movement of the drive shaft 30 a damper 110 is also utilized. The damper 110 is shown as being surrounded by the spring 108, although other configurations are possible. The damper 110 is connected between the drive shaft 30 or inner race 66 and a rigid grease seal 112. The grease seal 112 is captured by the outer race 84 and the flange 80. As shown, the damper 110 is a hydraulic fluid type damper. The damper 110 functions to limit any rearward velocity or acceleration of the drive shaft 30 by damping relative axial movement between the inner race 66 and the outer race 84. Although the damper is shown as being stopped or limited by the rigid grease seal 112, it is to be understood that the damper can be limited by any other element relatively fixed with respect to the outer race. For example, the damper could abut the differential input shaft nut 82. Also, other structures, not shown, could be used to tie or link the damper 110 to the outer race, 84, the diverging flange 80, or other elements fixed relative to the outer race so that the damper can operate to dampen movement of the inner race relative to the outer race.

The damper can be any kind of damper suitable for inhibiting rearward movement of the inner race. A preferred damper would include a plunger or piston movable through a fluid-filled housing or cylinder, with the fluid being required to flow through one or more small, defined openings in order for the plunger to move through the cylinder. Although a hydraulic fluid-filled damper is illustrated and preferred, it is to be understood that other types of dampers, such as magnetic/electric resistance dampers could also be used. Further, the damper could be filled with a rheological fluid having its viscosity controlled by electrical controls. In contrast to the resistance force applied by the spring 108, the damper applies a variable resistance force against the rearward movement of the inner race. The force varies with the load, with the amount of resistance generally being a function of the speed or force which the plunger is pushed through the fluid-filled cylinder.

The above description pertains to the second or rearward joint 40. Typically the first or forward joint 24 will be substantially identical to the second joint 40. The front end 32 of the drive shaft 30 is connected with the rear end 26 of the front constant velocity universal joint 24, and specifically to the inner race of universal joint 24. A front spring, not shown, and a front damper, not shown, are operatively connected to the universal joint 24 in a manner similar to that shown for the rear constant velocity universal joint 40 to provide a resistance force to inhibit movement of the inner race of the front universal joint 24 with respect to the outer race of the joint 24. For maximum advantage it is preferred that both the front constant velocity universal joint 24 and the rear constant velocity universal joint 40 each be provided with both a spring and a damping mechanism. It is to be understood, however, that the invention includes configurations where only one of the two constant velocity universal joints is provided with a spring and damping mechanism.

Although the invention has been described illustrating the spring and the damper both being associated with the same constant velocity universal joint, it is to be understood that the spring and damper can be mounted on or associated with the constant velocity universal joints at opposite ends of the driveshaft. It can be seen that broadly stated, at least one of the first and the second plunging constant velocity joints is provided with a spring connected with the plunging constant velocity joint biasing the front and rear ends of the plunging constant velocity joint to a predetermined axial position relative to one another; and at least one of the first and the second plunging constant velocity joints is provided with a damper connected with the plunging constant velocity joint to dampen axial movement of the front and rear ends of the constant velocity joint with respect to one another.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A drive train comprising:

a first rotative drive member;

a first plunging constant velocity joint with a front end connected with the first rotative member, the first plunging constant velocity joint having a rear end torsionally connected with the front end;

a drive shaft with a front end and a rear end, the drive shaft front end being connected with the rear end of the first plunging constant velocity joint; and a second plunging constant velocity joint with a front end connected with the rear end of the drive shaft, and with a rear end connected with a second drive member;

wherein at least one of said first and said second plunging constant velocity joints is provided with a spring connected with the plunging constant velocity joint biasing the front and rear ends of the plunging constant velocity joint to a predetermined axial position relative to one another; and wherein at least one of said first and said second plunging constant velocity joints is provided with a damper connected with the plunging constant velocity joint to dampen axial movement of the front and rear ends of the constant velocity joint with respect to one another.

2. A drive train as described in claim 1 wherein both of said first and said second plunging constant velocity joints are provided with a damper to dampen axial movement of the front and rear ends of the constant velocity joints with respect to one another.

3. A drive train as described in claim 2 wherein both of said first and said second plunging constant velocity joints are provided with a spring biasing the front and rear ends of the plunging constant velocity joints to a predetermined axial position relative to one another.

4. A drive train as described in claim 1 wherein the plunging constant velocity joint has a housing, and the spring and the damper are positioned within the housing.

5. A drive train as described in claim 1 wherein the damper is a hydraulic damper.

6. A drive train as described in claim 1 wherein the damper is surrounded by the spring.

7. A drive train comprising:
a first rotative drive member;
a first plunging constant velocity joint with a front end connected with the first rotative member, the first plunging constant velocity joint having:
a rear end torsionally connected with the front end;
a spring connected with the first plunging constant velocity joint biasing the front and rear ends of the first plunging constant velocity joint to a predetermined axial position relative to one another; and
a damper connected with the first plunging constant velocity joint to dampen axial movement of the front and rear ends of the first constant velocity joint with respect to one another;
a drive shaft with a front end and a rear end, the drive shaft front end being connected with the rear end of the first plunging constant velocity joint; and
a second plunging constant velocity joint with a front end connected with the rear end of the drive shaft, the second plunging constant velocity joint having:
a rear end connected with a second drive member;
a spring connected with the second plunging constant velocity joint biasing the front and rear ends of the second plunging constant velocity joint to a predetermined axial position relative to one another; and
a damper connected with the second plunging constant velocity joint to dampen axial movement of the front and rear ends of the second constant velocity joint with respect to one another.

8. A drive train as described in claim 7 wherein each plunging constant velocity joint has a housing, and the spring and the damper are positioned within the housing.

9. A drive train as described in claim 7 wherein the damper is a hydraulic damper.

10. A drive train as described in claim 7 wherein the damper is surrounded by the spring.

11. A drive train as described in claim 10 wherein each plunging constant velocity joint has a housing, and the spring and the damper are positioned within the housing.

12. A drive train as described in claim 11 wherein the damper is a hydraulic damper.

13. A drive train as described in claim 8 wherein the housing of the second plunging constant velocity joint is connected with the second plunging constant velocity joint rear end.

14. A plunging constant velocity joint for connecting a first rotative member having a first rotative axis to a second rotative member having a second rotative axis comprising:
a front end for connection with the first rotative member;
a rear end connected with the second rotative member, the rear end being torsionally connected with the front end;
a spring biasing the front and rear ends to a predetermined relative axial position with respect to one another; and
a damper connected with the plunging constant velocity joint to dampen axial movement of the front and rear ends of the joint with respect to one another.

15. A plunging constant velocity joint as described in claim 14 wherein the joint has a housing and the spring and the damper are positioned within the housing.

16. A plunging constant velocity joint as described in claim 15 wherein the housing is connected with the rear end.

17. A plunging constant velocity joint as described in claim 16 wherein the damper is a hydraulic damper, and wherein the damper is surrounded by the spring.

18. A plunging constant velocity joint as described in claim 14 wherein the damper is a hydraulic damper.

19. A plunging constant velocity joint as described in claim 18 wherein the damper is surrounded by the spring.

20. A plunging constant velocity joint as described in claim 14 wherein the damper is surrounded by the spring.

* * * * *